(12) United States Patent
Manjeshwar et al.

(10) Patent No.: US 7,057,178 B1
(45) Date of Patent: Jun. 6, 2006

(54) METHOD AND SYSTEM FOR IMAGING USING A FILTER FOR TIME-OF-FLIGHT PET

(75) Inventors: Ravindra Mohan Manjeshwar, Guilderland, NY (US); Charles William Stearns, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/988,878

(22) Filed: Nov. 15, 2004

(51) Int. Cl.
*G01T 1/166* (2006.01)
(52) U.S. Cl. ............................................. 250/363.04
(58) Field of Classification Search ............ 250/363.04
See application file for complete search history.

(56) References Cited

U.S. PATENT DOCUMENTS 5,272,343 A * 12/1993 Stearns .................. 250/363.03

OTHER PUBLICATIONS

Mallon et al., Three-dimensional PET reconstruction with time-of-flight measurement, 1992, Phys. Med. Biol., vol. 37, No. 3, 717-729.*
Snyder et al., A Mathematical Model For Positron-Emission Tomography Systems Having Time-Of-Flight Measurements, Jun. 1981, IEEE Transactions on Nuclear Science, vol. NS-28, No. 3, 3575-3583.*
Politte, D.G., Image Improvements in Positron-Emission Tomography due to measuring differential time-of-flight and using maximum likelihood estimation, IEEE Transactions on Nuclear Science, Apr. 1990, 737-742, vol. 37, No. 2.
Snyder, Donald L. et al, A mathematical model for Positron-Emission Tomography systems having time-of-flight measurements, IEEE Transactions on Nuclear Science, Jun. 1981, vol. NS-28,No. 3.

* cited by examiner

*Primary Examiner*—David Porta
*Assistant Examiner*—Marcus Taningco
(74) *Attorney, Agent, or Firm*—The Small Patent Law Group; Dean D. Small (57) ABSTRACT

Methods and systems for imaging by using a filter for Time-Of-Flight Positron Emission Tomography (TOF PET) are described. The described methods of imaging a patient by using a positron emission tomography (PET) system includes acquiring a plurality of frames of sinogram data, filtering the acquired sinogram data and back-projecting the filtered sinogram data to form an output image of the patient. The acquired sinogram data defines a line of response (LOR) and a time-of-flight (TOF) measurement that localizes positron annihilation within the patient. The filtering of the acquired sinogram data is performed using the TOF measurement.

26 Claims, 7 Drawing Sheets

Conventional PET

Conventional BP Technique

FIG. 7

Ramp Filtered FBP

FIG. 8  Unfiltered CW BP

FIG. 9  Ramp Filtered CW BP

FIG. 10  Modified Ramp Filtered CW BP

METHOD AND SYSTEM FOR IMAGING USING A FILTER FOR TIME-OF-FLIGHT PET

BACKGROUND OF THE INVENTION

This invention relates generally to positron emission tomography (PET) systems, and more particularly, to the reconstruction of images in a Time-of-Flight PET (TOF-PET) system using an analytical filter.

Positrons are positively charged electrons that are emitted by radionuclide substances. These radionuclide substances, called "radiopharmaceuticals", are employed as radioactive tracers and are injected in a patient to be scanned. The radionuclide substances decay and emit positrons. The positrons collide with electrons in the patient's body and are annihilated. The annihilation process produces two gamma rays. These gamma rays are referred to as photons. The emitted photons are directed in nearly opposite directions, each with energy of 511 KeV. A PET scanner generates an image by determining the number of such annihilations at each location within a field of view.

A PET scanner typically includes a detector ring assembly. This detector ring assembly includes rings of detectors that encircle the patient. Coincidence detection circuits connect to the detectors and record the detected photons. However, only those photons that are detected within a pre-determined time-interval, called the coincidence window, are recorded. These recorded simultaneous detections are termed coincidence events and the detected photons are termed as coincidence photons. The photons are detected by detectors located on opposite sides of a line joining the detectors and passing through the point of annihilation. The virtual line joining the two detectors that detect a pair of annihilation photons is called a Line Of Response (LOR). Each LOR is characterized by a radial distance (r) from the center of the detector ring, and an angle (θ) from the horizontal axis through the center of the detector ring. The coincidence events detected by a PET scanner are binned together in possible LORs.

The LORs are grouped together into a plurality of sinograms or projection planes, which is the ordering of the LORs on the basis of the radial distance, r, and the angle, θ. The sinograms or projection planes are then transformed by using mathematical operations to generate final output images. This transformation process is called tomographic image reconstruction. The reconstructed image represents the distribution of the activity within the object being scanned.

In the conventional PET systems, according to the tomographic image reconstruction process, the coincident events, also called the annihilation events, can best be localized only across the length of the LOR with uniform probability. The localization is performed using uniform probability as all the coincidence events originating from the line between a pair of detectors are binned together into the corresponding LOR. This basic tomographic image reconstruction technique is called Back-Projection (BP).

The image obtained through BP operation is, however, blurred and distorted. To overcome this problem, a ramp filter is used. This technique is called Filtered Back-Projection (FBP). This technique helps recover high frequencies and prevents blurring of the image.

In a TOF-PET system, in addition to detecting the coincident events inside the coincidence time window, the difference in the detection times between the two photons is stored. This difference in the detection times is called the 'Time-of-Flight'. The elements of a sinogram in a TOF-PET system have the co-ordinate of TOF, in addition to the radial distance, r, and the angular co-ordinate, θ. Since both of the detected photons travel at the same speed (the constant speed of light), the exact time of flight is indicative of the position along a LOR. For example, the coincidence events with TOF=0 can be localized to the mid-point between the detector pairs. Further, the coincidence events with TOF=1 ns can be localized to 15 cm from the mid-point between the two detectors in the direction of the detector that detected the first photon in the pair. This ability to localize the annihilation event increases the signal-to-noise ratio in the reconstructed image. In practical TOF-PET systems, the measurement of TOF is not exact and there is some uncertainty in its measurement. The extent of uncertainty in the TOF measurement depends on the timing resolution of the detectors. Typically, the uncertainty in the TOF measurement has a Gaussian distribution that is quantified by the Full Width at Half Maximum (FWHM) of the Gaussian distribution. This uncertainty in the measurement of TOF translates to an uncertainty in the localization of the annihilation events. Since the uncertainty in TOF measurement has a Gaussian distribution, the uncertainty in the localization of the annihilation events also has a Gaussian distribution.

During image reconstruction, the localization of events is implemented by distributing (back-projecting) the events in a TOF LOR along the line between the two detectors with a probability based on the timing resolution of the detectors. This process of back projecting timing uncertainty profiles instead of uniform back-projection is called Confidence-Weighted Back-Projection (CW BP). A mathematical model of the CW BP is given by Donald L. Synder et al., in the paper: "A mathematical model for Positron-Emission tomography systems having Time-of-Flight measurements", IEEE Transactions on Nuclear Science, Vol. NS-28, No. 3, June 1981. Similar to BP, the conventional techniques used for CW BP produces a blurred and distorted image. In particular, a simple ramp filter, similar to the one used in conventional FBP, over-compensates for high frequencies and may produce over and/or under-shoots.

In conventional CW BP, this over-amplification of the high frequencies results from filtering the reconstructed image with a low-pass filter to reduce power in the higher frequencies. The strength of filtering in these systems, by using the conventional CW BP is chosen based on the desired resolution of the image and not accounting for the time-of-flight.

BRIEF DESCRIPTION OF THE INVENTION

In one exemplary embodiment, a method of imaging a patient using a positron emission tomography (PET) system is provided. The method includes acquiring a plurality of frames of sinogram data, filtering the acquired sinogram data and back-projecting the filtered sinogram data to form an output image of the patient. The acquired sinogram data defines a line of response (LOR) and a time-of-flight (TOF) measurement that localizes a positron annihilation within the patient. The filtering of the acquired sinogram data is performed using the TOF measurement.

In another exemplary embodiment, a PET system is provided. The PET system includes a PET scanner and a controller. The controller controls the operation of the PET scanner. The controller is configured to acquire sinogram data that defines a line of response and a time difference measurement that localizes a positron annihilation along the LOR based on a time difference between acquisition of a pair of annihilation photons. The controller is also configured to filter the acquired sinogram data by using an uncertainty profile of the time difference. The filter includes a ramp that is numerically convolved in the frequency domain. In addition, the controller is configured to back-project the filtered sinogram data to form an output image of the patient.

DETAILED DESCRIPTION OF THE INVENTION

Various embodiments of the invention provide methods and systems to enable a Confidence-Weighted Back-Projection (CW BP) with filtering for Time-Of-Flight Positron Emission Tomography (TOF PET). The embodiments utilize an analytical filter to improve the quality of image by preventing blurring and distortion of the final output images.

Figure 1:
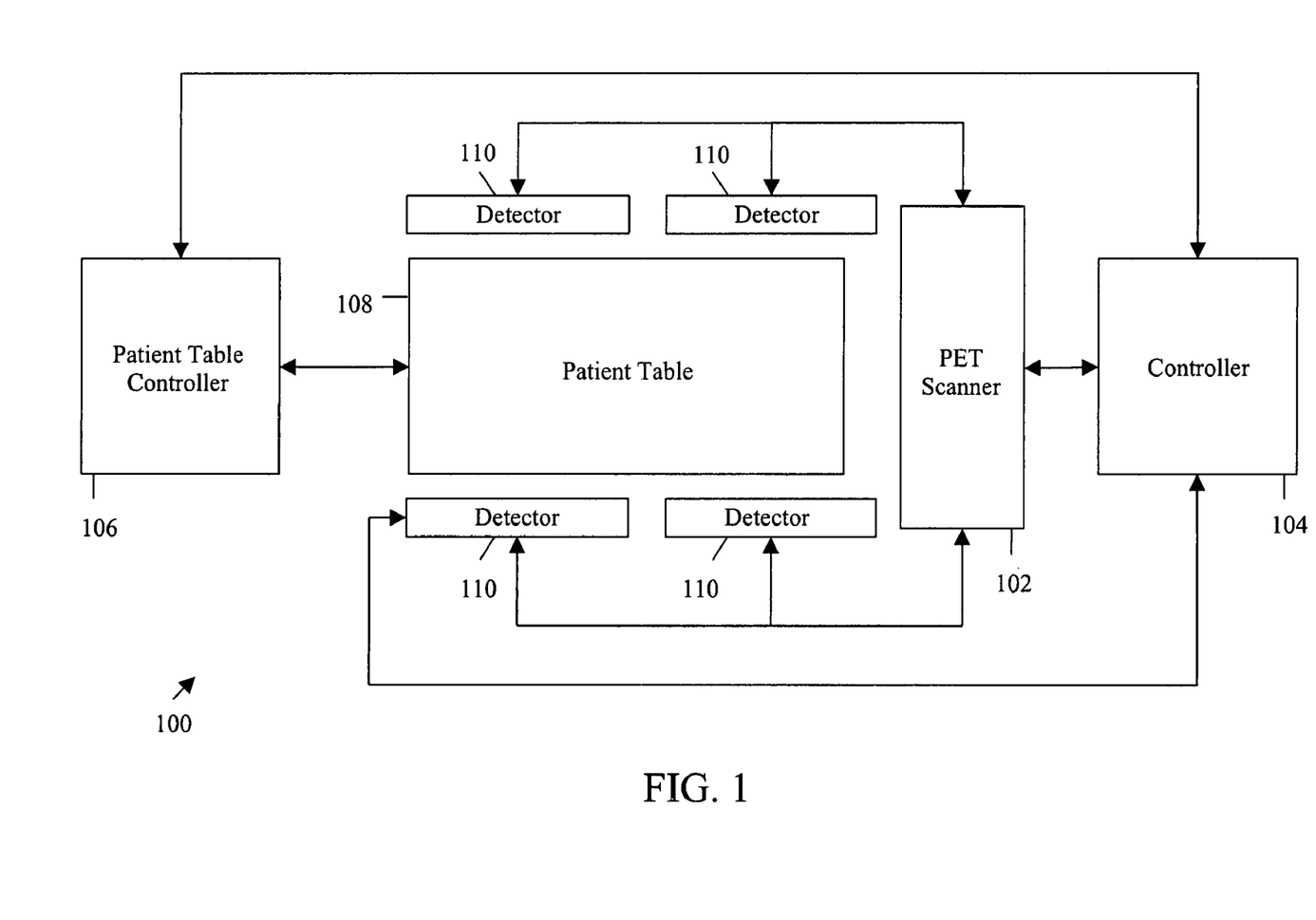
FIG. 1 is a block diagram of a PET system, in accordance with an exemplary embodiment of the invention.

FIG. 1 is a block diagram of a PET system, in accordance with an exemplary embodiment of the invention. PET system 100 includes a PET scanner 102 and a controller 104. In accordance to various embodiments of the invention, PET system 100 further includes a patient table controller 106, a patient table 108 and PET detectors 110. Patient table 108 supports a patient, who is to be scanned, to acquire an image of the relevant portion of the body of the patient. Patient table 108 holds the patient within a viewable area of a plurality of detectors 110. Patient table 108 can be moved along a viewable area axis that is defined by detectors 110.

Detectors 110 detect activity to acquire sinogram data. Detected activity is annihilation of positrons within the patient. When a positron annihilates, two photons are emitted in opposite directions, i.e. 180 degrees apart. The line along which the annihilation photons are detected is called a Line Of Response (LOR). The pair of emitted photons is detected by a pair of detectors 110. The annihilation event is also called a coincident event as two coincident photons are emitted by the annihilation of a positron. Each detector 110 may include a scintillator, a Photo Multiplier Tube (PMT), an amplifier and a digitizer. The scintillator detects the photon. The output of the detector is used as the sinogram data. Detectors 110 cause an uncertainty in timing an annihilation event along a LOR. This uncertainty depends on type of detectors 110 used. The uncertainty caused may be, for example, due to any noise induced in detectors 110.

To acquire the sinogram data, patient table 108 may be needed to be moved along the axis. This enables scanning different longitudinal positions of the patient. A patient table controller 106 controls the movement of patient table 108. Patient table controller 106 positions patient table 108 at different longitudinal locations along the viewable area axis. The sinogram data acquired for a particular longitudinal position forms a frame of sinogram data.

The sinogram data acquired is communicated to PET scanner 102. In accordance to various embodiments of the invention, PET scanner 102 is a PET/Computed Tomography (CT) dual modality scanner. The operation of the scanner is controlled by controller 104.

Controller 104 is configured to acquire the sinogram data and localize the positron annihilation along the LOR defined by the acquired sinogram data. Controller 104 is further programmed to filter the acquired sinogram data. The filtered sinogram data is then reconstructed by controller 104 to form the final output image of the patient. The operations involved in the image reconstruction process of filtering and back-projecting, such as, computing the Fourier transform of the sinogram data, multiplying it by a ramp filter and computing its inverse Fourier transform are also performed by controller 104. In accordance with various embodiments of the invention, the filtering is performed after back-projecting the acquired data, to get a final output image. At least one of detectors 110 is coupled to controller 104 to enable communication between controller 104 and detectors 110. Controller 104 is also communicatively coupled to patient table controller 106. In accordance to various embodiments of the invention, a single controller is configured to perform the functions of both patient table controller 106 and controller 104.

The imaging, in accordance with the invention is performed by using the Time-Of-Flight PET (TOF PET) technique. In accordance with this technique, a detected positron annihilation is localized on a corresponding LOR with the help of a timing uncertainty profile. The timing uncertainty profile is based on the difference in the time at which two coincident annihilation photons are detected by corresponding detectors 110 and the uncertainty in the measurement of the difference in time. The uncertainty is equal to the timing resolution.

The photons are detected within a specified time. This is called a coincidence time window. In case of TOF PET, the coincidence time window includes a plurality of time difference periods. The photons are detected within these time difference periods, and as mentioned earlier, the difference in time in the detection of the two coincident annihilation photons gives the basis of localizing a positron annihilation within the patient. The timing uncertainty profile can only define a probability of the location of the positron annihilation, as there exists a degree of uncertainty as described earlier.

The back-projection is preformed based on the timing uncertainty profile. This technique is called the confidence-weighted back projection (CW BP). The computation of back projected image based on the CW BP technique localizes the detected activity along each LOR by multiplying the measured sinogram data with the system transition matrix, $P_{TP}$. The system transition matrix defines the mapping of events from sinogram coordinates to image coordinates. Mathematically, the back projected image is given as follows:

$$\hat{F}_{CW-BP} = P_{TP}^T \lambda \qquad (1)$$

where $\hat{F}_{CW-BP}$ is the back-projected image

λ is the 2D sinogram or 3D projection plane $P_{TP}$ is the system transition matrix The system transition matrix $P_{TP}$ determines the probability that an annihilation event occurred at a certain location within the patient. For TOF PET, back-projection is not performed uniformly along the LOR but instead its distribution along the LOR is based on the timing uncertainty profile. The system transition matrix $P_{TP}$ is obtained by multiplying the uniform activity distribution among the image pixels between two detectors by the timing uncertainty profile.

The image obtained by using conventional CW BP is distorted and blurred. However, while the blurring function or the point-spread function is of type l/r for a conventional back-projection, the point-spread function for CW BP is given by:

$$PSF(r) = \frac{1}{\sigma\sqrt{2\pi}} e^{\frac{r^2}{2\sigma^2}} \times \frac{1}{r} \qquad (2)$$

where,

σ is the standard deviation of the location uncertainty which is based on the timing uncertainty. For example, a timing uncertainty of 1 ns (FWHM) translates to a location uncertainty of 15 cm (FWHM). The location uncertainty is linearly related to the timing uncertainty.

Therefore the CW BP is less blurred and distorted compared to the conventional BP image. The extent of the blurring depends on the parameter, σ, the uncertainty in the timing measurement. Small values of σ result in sharper images. The blurring of the CW BP can be corrected by applying a filter that is the inverse of the point-spread function. However, the simple ramp filter used for conventional BP image does not account for the reduced blurring in a CW BP image and makes the image sharper than desired which can result in overshoots and undershoots. This is illustrated with reference to FIG. 8. The filter that is provided, in accordance with various embodiments of the invention, prevents these undershoots and overshoots. The technique for filtering that is used is called Confidence-Weighted Filtered Back-Projection (CW FBP). The provided filter is referred to as a modified ramp filter. This filtering technique is hereinafter described in conjunction with FIGS. 2 and 3.

Figure 2:
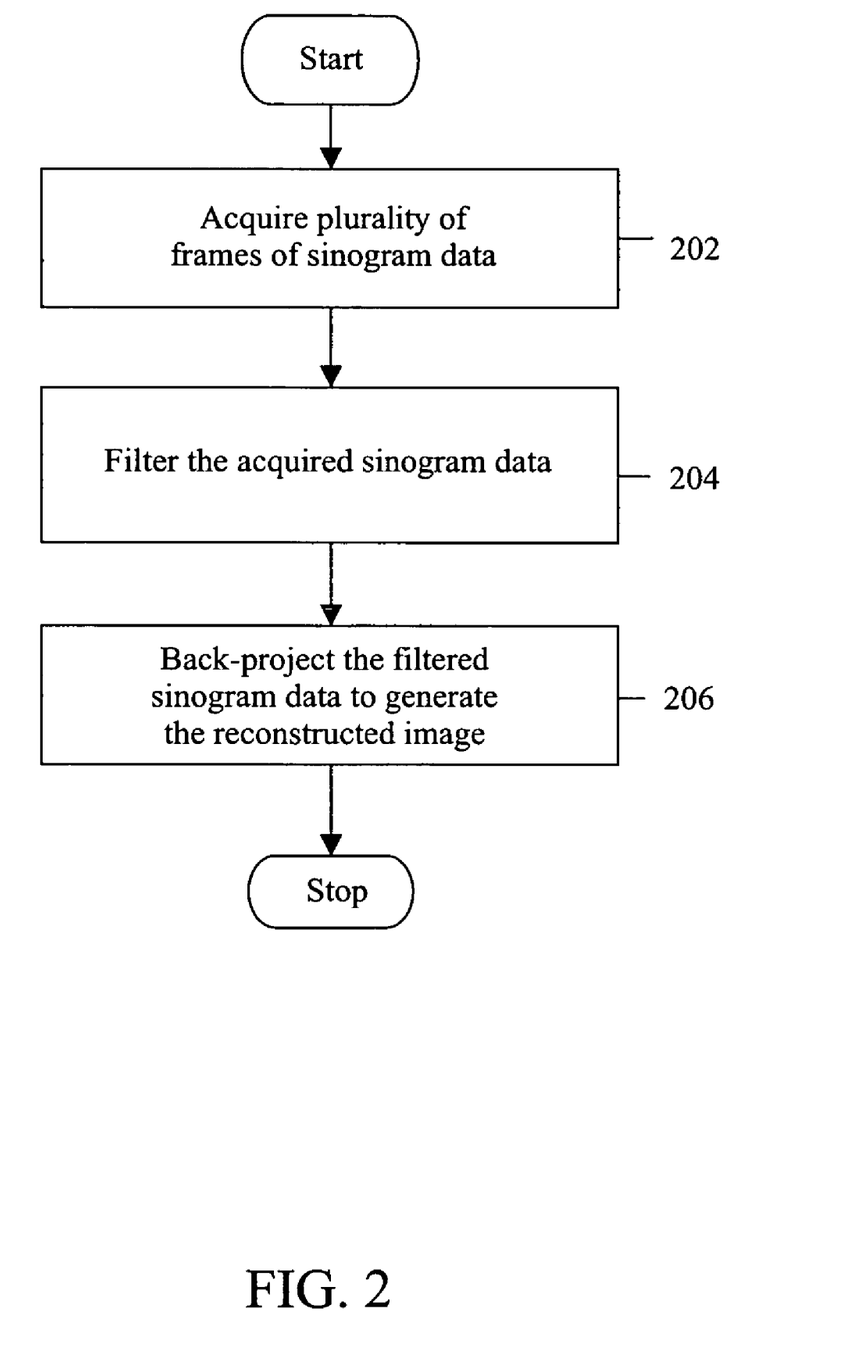
FIG. 2 is a flowchart showing the steps to image a patient using a PET system, in accordance with an exemplary embodiment of the invention.

FIG. 2 is a flowchart showing the steps to image a patient by using PET system 100, in accordance with an exemplary embodiment of the invention. At step 202, frames of sinogram data are acquired. The sinogram data defines the LOR and the TOF measurement that helps in localizing positron annihilations within the patient. The TOF measurement includes the time difference measurements. As described earlier, detectors 110 and scanner 102 are responsible for acquiring the sinogram data. The sinogram data may be binned either into a plurality of 2D sinograms or into a plurality of 3D projection planes. TOF sinograms are characterized by three parameters, namely: radial coordinate, defined as r, the angular coordinate, defined as θ, and the time difference in the detection of the two individual gamma photons, defined as Δt. Sinogram data in 3D projection planes are characterized by four parameters, namely: radial coordinate, defined as r, angular coordinates, defined as θ and ϕ, and the time difference, Δt.

At step 204, controller 104 filters the acquired sinogram data by using the timing uncertainty profile. This step is explained in detail with reference to FIG. 3. At step 206, controller 104 back-projects the filtered sinogram data. The back-projection gives the final output image. The back-projection is performed, as described earlier, according to the spatial confidence weighted profile.

Figure 3:
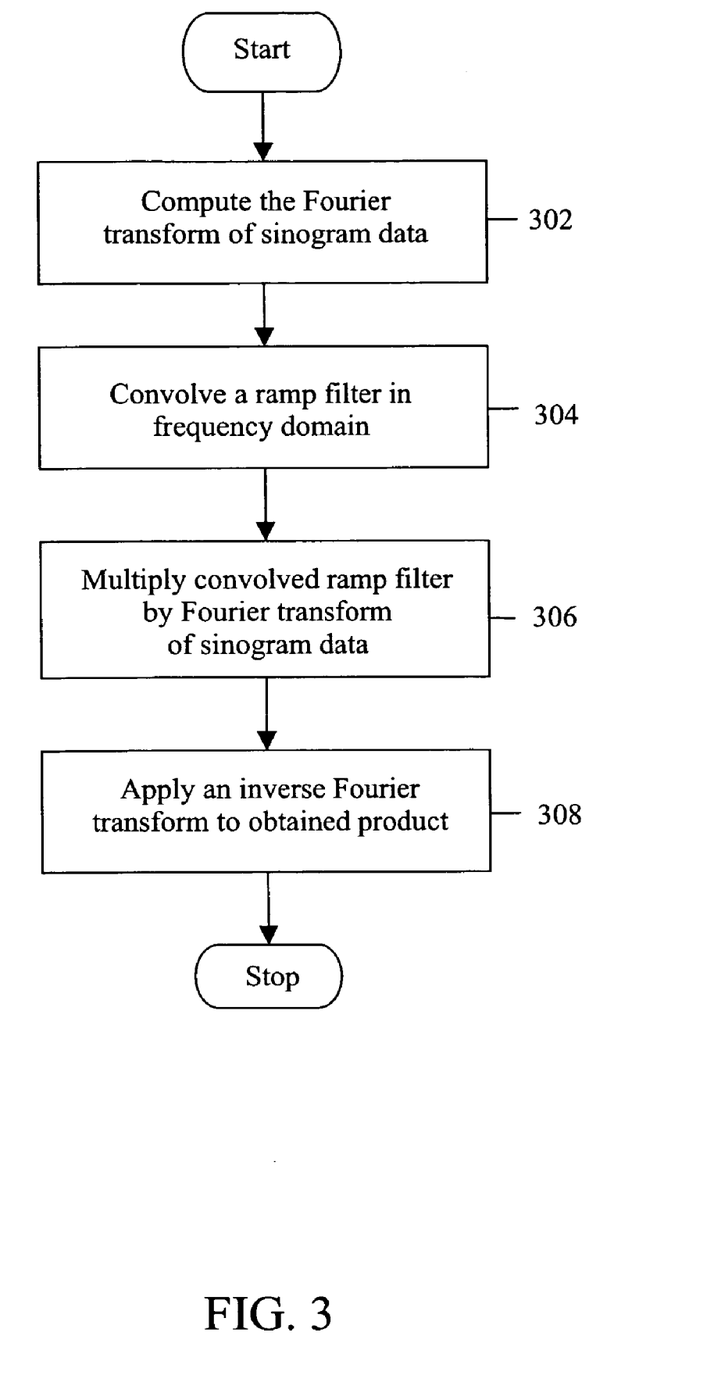
FIG. 3 is a flowchart showing the steps to filter acquired image data, in accordance with an exemplary embodiment of the invention.

FIG. 3 is a flowchart showing the steps to filter the acquired sinogram data, in accordance with an exemplary embodiment of the invention. The technique of filtering and back-projecting the sinogram data acquired by the TOF PET is called the CW FBP. This can be mathematically given as follows:

$$\hat{F}_{CW-FBP} = (P_{TP}^T P_{TP})^{-1} P_{TP}^T \lambda \qquad (3)$$

where $\hat{F}_{CW-BP}$ is the back-projected image

λ is the 2D sinogram or 3D projection plane $P_{TP}$ is the system matrix

At step 302, the Fourier transform of the sinogram data is computed to be used for image reconstruction. The operator $(P_{TP}^T P_{TP})^{-1}$ is a matrix that represents a modified ramp filter in the Fourier domain. The property of Fourier transform, that multiplication in the spatial domain is equivalent to convolution in the frequency domain, is made use of. The modified ramp filter is equal to the convolution of the simple ramp filter by the Fourier transform of the timing uncertainty profile. Therefore, at step 304, a ramp filter is numerically convolved in the frequency domain with the Fourier transform of the timing uncertainty profile $P_{TP}^T$.

At step 306, in accordance with the mathematical expression (according to equation (3)), the result of the performed convolution is multiplied by the Fourier transform of the acquired sinogram data, λ, i.e., the 2D sinogram or the 3D projection plane. At step 308, an inverse Fourier transform is applied to the product computed at step 306 to result in the reconstructed image.

Figure 4:
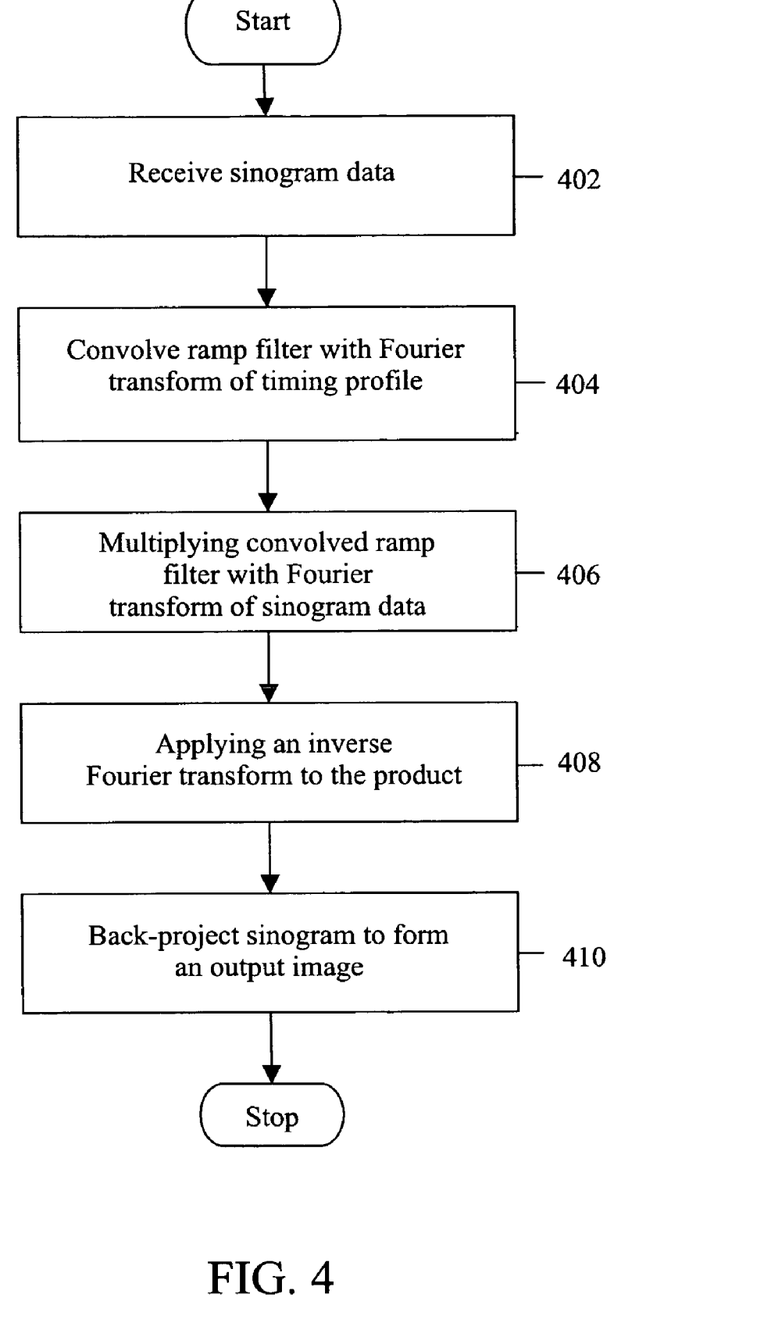
FIG. 4 is a flowchart showing the steps of reconstructing PET images of a patient, in accordance to various embodiments of the invention.

FIG. 4 is a flowchart showing the steps of reconstructing PET images of a patient, in accordance to various embodiments of the invention. At step 402, sinogram data corresponding to the patient is received by controller 104. The received sinogram data defines the LOR between a pair of detectors that detect the photons. The received sinogram data includes a time difference measurement that localizes a positron annihilation within the patient. The sinogram data further includes a plurality of 2D sinograms and/or 3D projection planes.

At step 404, the received sinogram data is filtered by using a ramp filter that is numerically convolved with the Fourier transform of the timing uncertainty profile. The convolution of the ramp filter with the timing uncertainty profile is performed in the frequency domain. At step 406, the result of the convolution, called as the convolved ramp filter, is multiplied with the Fourier transform of the received sinogram data. The received sinogram data is, thus, filtered with the help of a modified ramp filter.

At step 408, an inverse Fourier transform is applied to the filtered sinogram data. The result of the inverse Fourier transform is then back-projected, at step 410. The final output image of the patient is obtained by back-projecting the filtered sinogram data.

In accordance with various embodiments of the invention, and in reference to the description of FIGS. 3 and 4, the filter may be applied to the output reconstructed image acquired by using the CW BP technique wherein the sinogram data is not filtered before back-projecting it. The application of the filter, in such a case, is as a 2D filter. The filter is then called rho-layered filtergrams. In accordance with various embodiments of the invention, the modified ramp filter is rotationally symmetric in image space.

Figure 5:
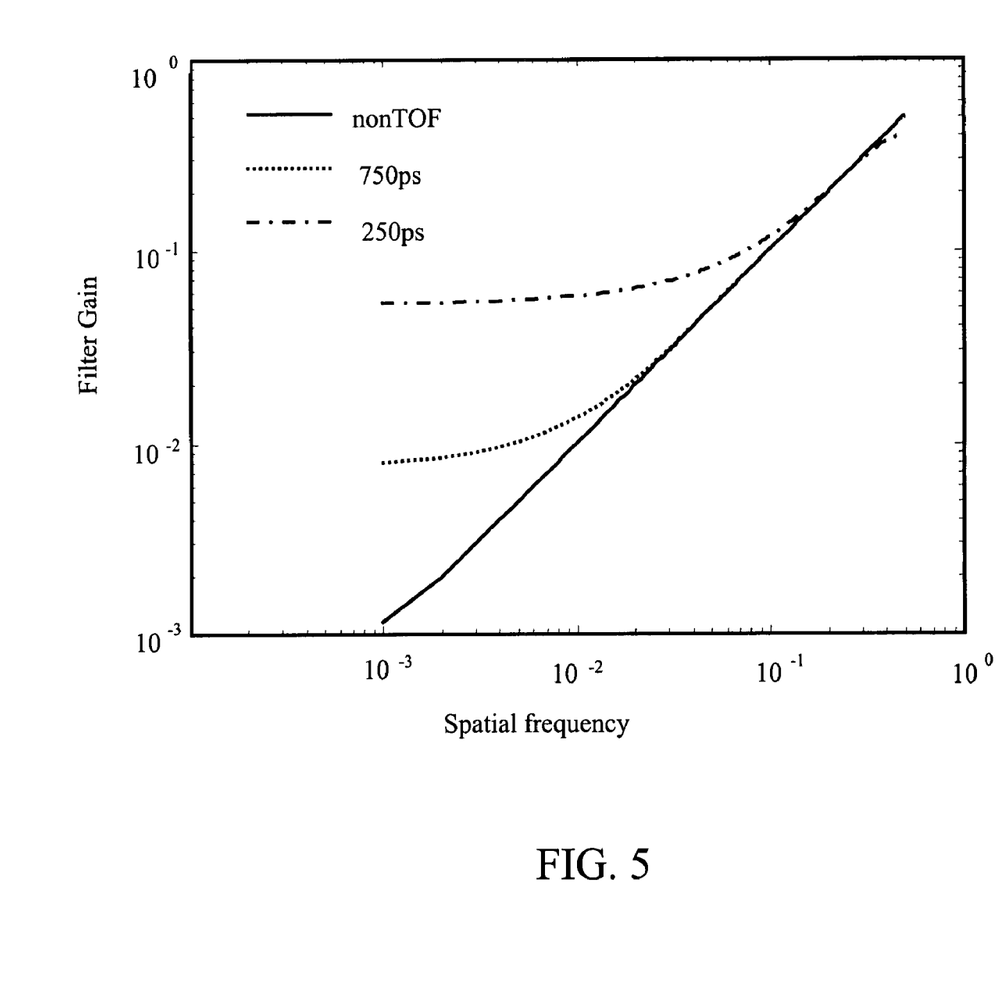
FIG. 5 is a graph showing the frequency domain representation of the impulse response of the modified ramp filter.

FIG. 5 is a graph showing the frequency domain representation of the impulse response of the modified ramp filter for different values of uncertainty in the timing measurements. The graph shows that as the uncertainty in the time difference measurement increases, the modified ramp filter approaches the conventional ramp filter.

Figure 6:
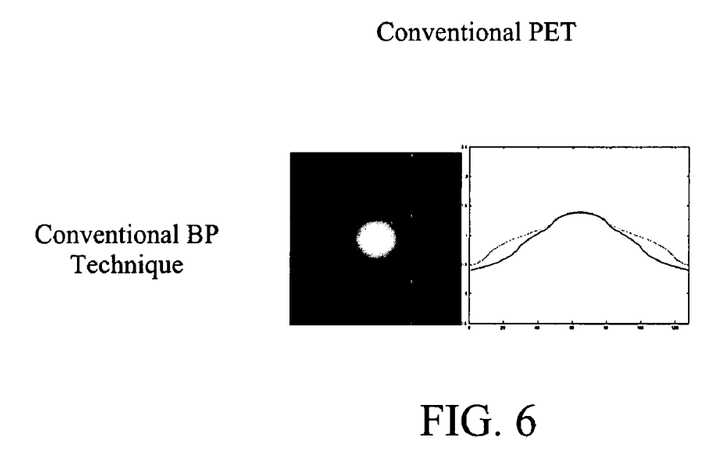
FIGS. 6, 7, 8, 9 and 10 provide a comparison between the reconstruction technique provided by an exemplary embodiment of the invention and the different reconstruction techniques used in the conventional PET systems by providing exemplary final output images acquired by these different techniques.
Figure 7:
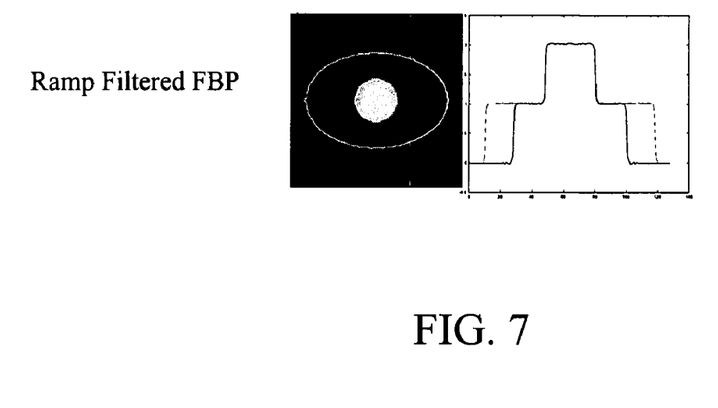

FIGS. 6, 7, 8, 9 and 10 provide a comparison between different reconstruction techniques used by providing exemplary final output images acquired by using these different techniques. Each figure shows exemplary final output images and a horizontal line profile through center of the reconstructed images. FIG. 6 shows an exemplary final output image and the corresponding line profile by using the conventional BP technique for a conventional PET scanner without TOF information. In this technique, filtering is not performed. As can be seen, the image obtained is distorted and blurred. FIG. 7 shows an exemplary final output image and corresponding line profile acquired by using the conventional FBP technique. In this technique, a simple ramp filter is used for filtering.

Figure 8:
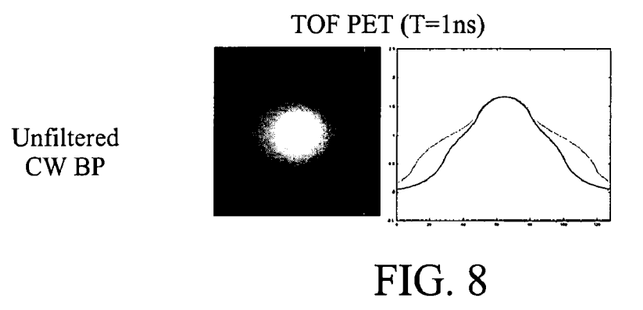
Figure 9:
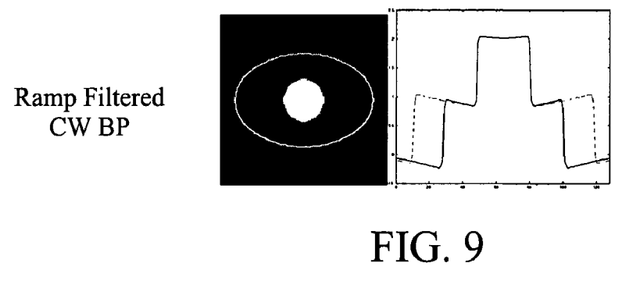
Figure 10:
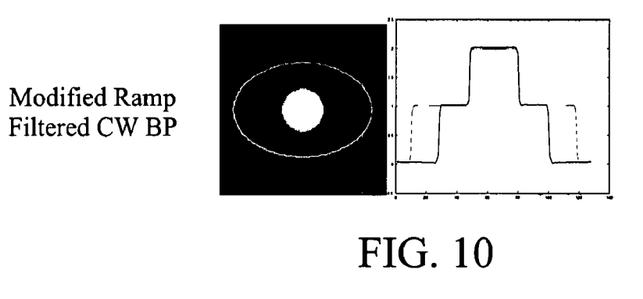

FIGS. 8 to 10 show exemplary output images for TOF PET with an uncertainty in the detection of 1 nanosecond. FIG. 8 shows an exemplary final output image and the corresponding line profile acquired for CW BP. In this case, filtering is not performed. The acquired image is distorted and blurred. It is, however, sharper than the image, depicted in FIG. 6, acquired by the conventional BP technique. FIG. 9 shows an exemplary final output image and corresponding line profile acquired by using the CW FBP technique. The filter used in this case is a simple ramp filter. The image obtained is sharper than the image obtained by the CW BP technique. However, as is seen in the line profile, there are overshoots and undershoots observed. FIG. 10 shows an exemplary final output image and corresponding sinogram acquired by the CW FBP technique. In this case, the used filter is a modified ramp filter, as provided by the various embodiments of the invention. As is observed in FIG. 10, the image acquired is not distorted or blurred. Further, there are no undershoots or overshoots.

A technical effect of various embodiments of the invention is reducing or preventing the blurring and distortion of the final output image.

Another technical effect of various embodiments of the invention is preventing overshoots or undershoots that are formed by the use of a simple ramp filter to filter sinogram data acquired by TOF PET. The reduction in distortions and blurring, in turn, improves the quality of the final output image acquired by TOF PET.

The various embodiments or components, specifically controller 104, thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method of imaging a patient using a positron emission tomography system, said method comprising:
  acquiring a plurality of frames of sinogram data wherein the sinogram data defines a line of response and a time-of-flight (TOF) measurement that localizes a positron annihilation within the patient;
  filtering the acquired sinogram data by numerically convolving a ramp filter in the frequency domain by a Fourier transform of a timing uncertainty profile using the TOF measurement; and
  back-projecting the filtered sinogram data to form an output image of the patient.

2. A method in accordance with claim 1 wherein the timing uncertainty profile defines an uncertainty in the measurement of the difference in the detection times of the two photons resulting from an annihilation event.

3. A method in accordance with claim 1 wherein the timing uncertainty profile defines a probability of the location of a positron annihilation within the patient.

4. A method in accordance with claim 1 further comprising:
  multiplying the convolved ramp filter by a Fourier transform of the acquired sinogram data; and
  applying an inverse Fourier transform to the product.

5. A method in accordance with claim 1 wherein the sinogram data defines a line of response between a pair of detectors.

6. A method in accordance with claim 5 wherein acquiring a plurality of frames of sinogram data comprises binning the sinogram data into a plurality of 2D sinograms.

7. A method in accordance with claim 1 wherein the sinogram data defines a projection plane.

8. A method in accordance with claim 7 wherein acquiring a plurality of frames of sinogram data comprises binning the sinogram data into a plurality of 3D projection planes.

9. A method in accordance with claim 1 wherein a coincidence time window comprises a plurality of time difference periods.

10. A method of reconstructing positron emission tomography images, said method comprising:
receiving sinogram data that defines a line of response between opposed detectors and a time difference measurement that localizes a positron annihilation within the image, the sinogram data comprising at least one of a plurality of sinograms and projection planes;
filtering the received sinogram data using a ramp filter that is numerically convolved in the frequency domain by a Fourier transform of the timing uncertainty profile;
multiplying the convolved ramp filter by a Fourier transform of the received sinogram data;
applying an inverse Fourier transform to the product; and
back-projecting the filtered sinogram data to form an output image of the patient.

11. A method in accordance with claim 10 wherein acquiring a plurality of frames of sinogram data comprises binning the sinogram data into a plurality of 2D sinograms.

12. A method in accordance with claim 10 wherein acquiring a plurality of frames of sinogram data comprises binning the sinogram data into a plurality of 3D projection planes.

13. A positron emission tomography system comprising:
a positron emission tomography scanner; and
a controller for controlling the operation of the positron emission tomography scanner, said controller configured to:
acquire sinogram data that defines a line of response and a time difference measurement that localizes a positron annihilation along the line of response based on a time difference between acquisition of a pair of annihilation photons;
filter the acquired sinogram data using an uncertainty profile of the time difference, said filter comprising a ramp filter that is numerically convolved in the frequency domain; and
back-project the filtered sinogram data to form an output image of the patient.

14. A positron emission tomography system in accordance with claim 13 wherein said ramp filter is numerically convolved in the frequency domain by a Fourier transform of the timing uncertainty profile.

15. A positron emission tomography system in accordance with claim 14 wherein said controller is further configured to:
multiply the convolved ramp filter by a Fourier transform of the acquired sinogram data; and
apply an inverse Fourier transform to the product.

16. A positron emission tomography system in accordance with claim 13 wherein said positron emission tomography system further comprises:
a plurality of detectors configured to detect annihilation photons;
a patient table configured to support a patient within a viewing area defined by the plurality of detectors; and
a patient table controller configured to control an axial position of the patient table within the viewing area.

17. A positron emission tomography system in accordance with claim 16 wherein said controller is communicatively coupled to at least one of the plurality of detectors and the patient table controller, said controller further configured to:
receive data from the plurality of detectors that define a line of response between two of the plurality of detectors that each detect an annihilation photon within a predetermined time window;
determine a time difference between the annihilation photons detection by two of the plurality of detectors wherein the time difference is proportional to a position of an annihilation event along the defined line of response;
filter the acquired sinogram data using the timing uncertainty profile; and
back-project the filtered sinogram data to form an output image of the patient.

18. A positron emission tomography system in accordance with claim 13 wherein said controller is further configured to numerically convolve a ramp filter in the frequency domain by a Fourier transform of the timing uncertainty profile.

19. A positron emission tomography system in accordance with claim 18 wherein said controller is further configured to:
multiply the convolved ramp filter by a Fourier transform of the acquired sinogram data; and
apply an inverse Fourier transform to the product.

20. A positron emission tomography system in accordance with claim 13 wherein the sinogram data defines a line of response between a pair of detectors.

21. A positron emission tomography system in accordance with claim 20 wherein said controller is further configured to bin the detected coincidence data into a plurality of 2D sinograms.

22. A positron emission tomography system in accordance with claim 13 wherein said controller is further configured to bin the coincidence data into a plurality of 3D projection planes.

23. A positron emission tomography system in accordance with claim 13 wherein a coincidence time window comprises a plurality of time difference periods.

24. A positron emission tomography system in accordance with claim 13 wherein the timing uncertainty profile defines a probability of the location of a positron annihilation within the patient.

25. A positron emission tomography system in accordance with claim 13 wherein the timing uncertainty profile defines an uncertainty of timing a coincidence event along the line of response.

26. A positron emission tomography system in accordance with claim 13 comprising a positron emission tomography (PET) scanner/computed tomography (CT) dual modality scanner.

* * * * *